United States Patent
Coskun et al.

(10) Patent No.: US 7,716,006 B2
(45) Date of Patent: May 11, 2010

(54) WORKLOAD SCHEDULING IN MULTI-CORE PROCESSORS

(75) Inventors: Ayse K. Coskun, La Jolla, CA (US); Aleksey M. Urmanov, San Diego, CA (US); Kenny C. Gross, San Diego, CA (US); Keith A. Whisnant, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 7 days.

(21) Appl. No.: 12/109,572

(22) Filed: Apr. 25, 2008

(65) Prior Publication Data

US 2009/0271141 A1 Oct. 29, 2009

(51) Int. Cl.
*G01K 1/12* (2006.01)
(52) U.S. Cl. .................................................... 702/132
(58) Field of Classification Search ................ 702/132, 702/182; 713/300, 320; 718/102, 105
See application file for complete search history.

(56) References Cited

U.S. PATENT DOCUMENTS

| 7,020,802 B2 | 3/2006 | Gross et al. |
| 7,272,516 B2 * | 9/2007 | Wang et al. .................... 702/60 |
| 7,490,017 B2 * | 2/2009 | Aguilar et al. .............. 702/130 |
| 2007/0124618 A1 * | 5/2007 | Aguilar et al. .............. 713/322 |

* cited by examiner

*Primary Examiner*—Bryan Bui
(74) *Attorney, Agent, or Firm*—Park, Vaughan & Fleming LLP

(57) ABSTRACT

A computer system that schedules loads across a set of processor cores is described. During operation, the computer system receives thermal measurements from sensors associated with the set of processor cores, and removes noise from the thermal measurements. Then, the computer system analyzes thermal properties of the set of processor cores based on the thermal measurements. Next, the computer system receives a process to be executed, and schedules the process to be executed by at least one of the processor cores based on the analysis. This scheduling is performed in a manner that reduces spatial and temporal thermal variations in the integrated circuit.

20 Claims, 6 Drawing Sheets

WORKLOAD SCHEDULING IN MULTI-CORE PROCESSORS

RELATED APPLICATIONS

This application is related to a pending U.S. patent application entitled, "Temperature-Aware and Energy-Aware Scheduling in a Computer System," by inventors Ayse K. Coskun, Kenny C. Gross, and Keith A. Whisnant, having Ser. No. 11/871,369, and filing date Oct. 12, 2007, to a pending U.S. patent application entitled, "Method and Apparatus for Generating a Dynamic Power-Flux Map for a Set of Computer Systems," by inventors Steven F. Zwinger, Kenny C. Gross, and Ramakrishna C. Dhanekula, having Ser. No. 11/479,542, and filing date Jun. 30, 2006, and to a pending U.S. patent application entitled, "Method and Apparatus for Balancing Thermal Variations Across a Set of Computer Systems," by inventors Kenny C. Gross, Keith A. Whisnant, Ramakrishna C. Dhanekula, and Steven F. Zwinger, having Ser. No. 11/588,788, and filing date Oct. 27, 2006. The above-listed applications are hereby incorporated by reference.

BACKGROUND

1. Field of the Invention

The present invention relates to techniques for balancing thermal variations and/or energy variations across a set of processors or processor cores on an integrated circuit.

2. Related Art

Elevated temperatures create a variety of challenges during operation of modern computer systems, including challenges associated with: reliability, availability, serviceability, timing, performance, cooling costs, and/or leakage power. For example, because of the increasing power densities in computer systems, cooling has become increasingly expensive, both for large-scale computer systems and for multiprocessor systems on-chip (MPSoC).

Moreover, the associated temperature increases exacerbate reliability issues, because hot spots and thermal cycling can increase the rate of failure during computer-system lifetimes. For example, spatial and temporal thermal variations can accelerate known degradation modes, including: solder fatigue, interconnect fretting, differential thermal expansion between bonded materials that lead to delamination failures, thermal mismatches between mating surfaces, differences in the coefficients of thermal expansion (CTEs) between packaging materials, wirebond shear and flexure fatigue, microcrack initiation and propagation in ceramic materials, and repeated stress reversals in brackets (which can lead to dislocations, cracks, and eventual mechanical failures).

Moreover, in computer systems that include multiple processor or multiple processor cores, operating-system-level schedulers are often used to perform load balancing and to distribute workload as evenly as possible across the processors (or processor cores). In general, load balancing balances processor utilization and therefore results in better performance. However, these schedulers often do not take the effects of temperature variations into account when determining workload schedules. Consequently, the resulting schedules often lead to temperature distributions that can exacerbate temperature-induced problems.

Additionally, operating-system-level schedulers in many computer systems that include multiple core processors perform so-called 'first-available' scheduling. If processors have 100% utilization, first-available scheduling does not affect the thermal distribution in these chips. However, utilization factors for processes in many computer systems are between 10-20%, in which case first-available scheduling can exacerbate spatial and temporal thermal variations. These thermal variations can also be increased in computer systems in which load balancing is based on locality (i.e., which cores share the same memory), because this scheduling technique tends to assign particular jobs or threads to the same group of cores unless these cores are busy or are executing higher priority jobs or threads.

Hence, what is needed are techniques for balancing workloads in a computer system without the problems described above.

SUMMARY

One embodiment of the present invention provides a computer system that schedules loads across a set of processor cores disposed on an integrated circuit. During operation, the computer system receives thermal measurements from sensors associated with the set of processor cores, and removes noise from the thermal measurements. Then, the computer system analyzes thermal properties of the set of processor cores based on the thermal measurements. Next, the computer system receives a process to be executed, and schedules the process to be executed by at least one of the processor cores based on the analysis. This scheduling is performed in a manner that reduces spatial and temporal thermal variations in the integrated circuit.

In some embodiments, the thermal properties include energy consumption and/or temperature.

In some embodiments, the scheduling attempts to map related processes to processor cores that share the same memory. Moreover, in some embodiments the scheduling facilitates load balancing across the set of processor cores.

In some embodiments, the scheduling is based on thermal properties of the set of processor cores.

In some embodiments, the thermal measurements include continuous telemetry measurements that are received from sensors disposed on the integrated circuit in proximity to the set of processor cores. Moreover, removing noise from the thermal measurements may involve validating the thermal measurements by comparing thermal measurements from the given sensor with predictions of a regression model that is based on measurements of other sensors that have a predetermined relationship with the thermal measurements from the given sensor. This regression model may include a multivariate state estimation technique (MSET). Note that the predictions may be used instead of the thermal measurements if the comparison indicates an error in the thermal measurements.

In some embodiments, another regression model is used to reduce noise in the thermal measurements without adding bias. This other regression model may include Tikhonov regularization.

In some embodiments, the thermal properties are estimated based, at least in part, on parameters of a computer system that contains the integrated circuit, where the parameters are determined using virtual sensors in an operating system of the computer system.

In some embodiments, analyzing the thermal properties involves using a thread which is separate from threads associated with other processes that are executed in the set of processor cores.

In some embodiments, the thermal measurements are received during a time interval, and the analysis of the thermal properties is based on thermal measurements during the time interval.

In some embodiments, the scheduling is probabilistic. More specifically, a probability of assigning processes to a given processor core during the time interval is determined based on one or more thermal properties of the given processor core during the time interval and a dynamic weight associated with the given processor core. Additionally, the probability of assigning processes may be determined using an adaptive-random technique. Note that the one or more thermal properties may include temperature.

Another embodiment provides a method including at least some of the above-described operations.

Another embodiment provides a computer-program product that facilitates the above-described operations on a computer system.

BRIEF DESCRIPTION OF THE FIGURES

Note that like reference numerals refer to corresponding parts throughout the drawings.

DETAILED DESCRIPTION

Figure 1:
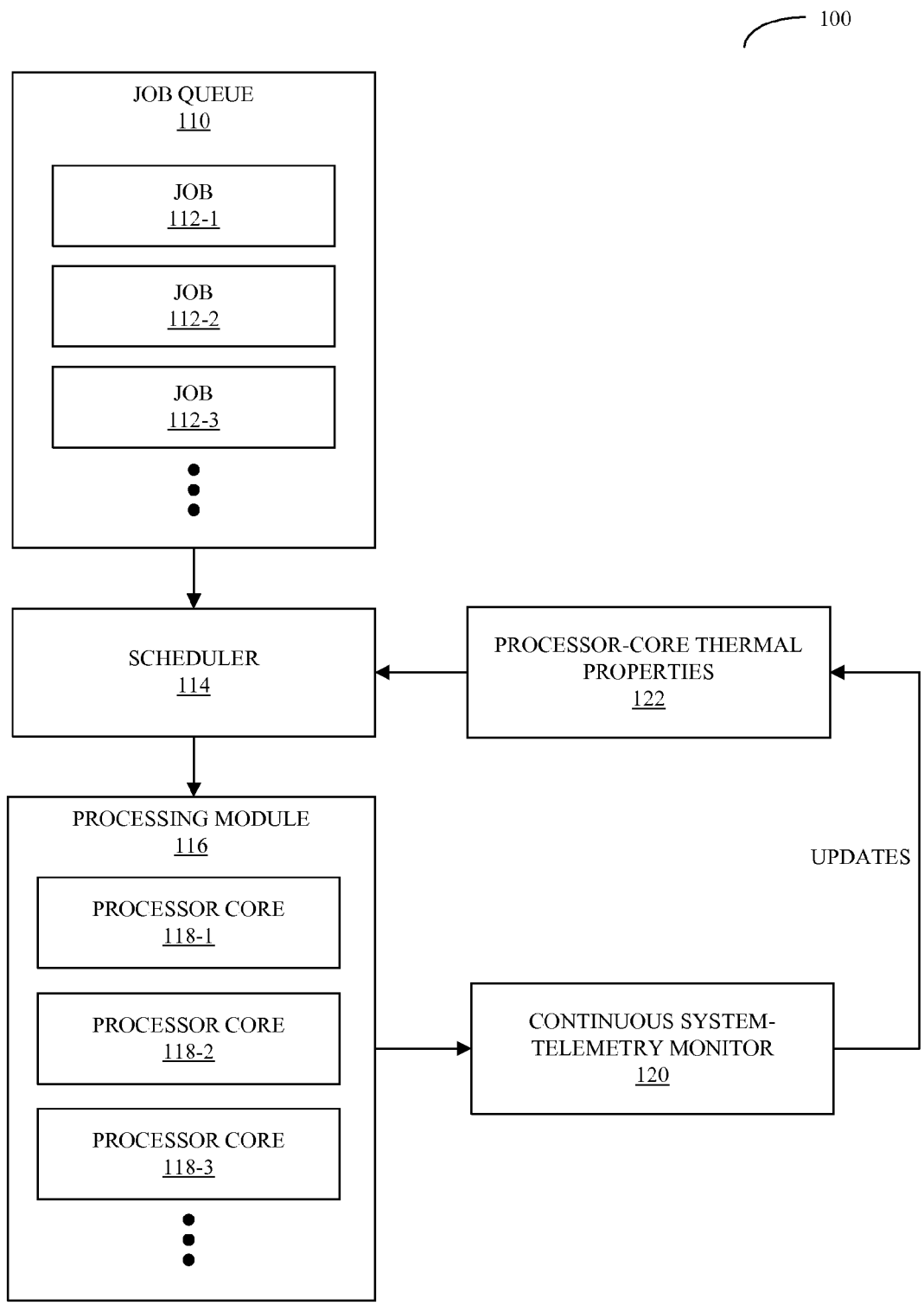
FIG. 1 is a block diagram illustrating a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (i.e., software) for use with the computer system are described. These systems and processes may be used to schedule processes (henceforth referred to as 'jobs') in a computer system for execution by a set of processor cores, which may be included in a single processor. For example, the set of processor cores may be disposed on an integrated circuit or chip. In particular, sensors in proximity to the set of processor cores may perform thermal measurements during a time interval. Subsequently, noise may be removed from the thermal measurements using a first regression model (such as an auto-regression model) which does not add bias in a control loop that is based on the thermal measurements. For example, the first regression model may include Tikhonov regularization.

Moreover, the thermal measurements and/or estimates that are based on parameters which are determined using physical or virtual sensors in an operating system of the computer system may be analyzed to determine thermal properties of the set of processor cores, such as energy consumption and/or temperature during the time interval. This analysis and/or the noise removal may include validation of the thermal measurements. For example, thermal measurements for a given sensor may be compared with predictions from a second regression model (such as a nonlinear, non-parametric regression model) that is based on measurements of other sensors that have a predetermined relationship with the thermal measurements from the given sensor. In some embodiments, the second regression model may include a multivariate state estimation technique (MSET). Note that the predictions may be used instead of the thermal measurements if the comparison indicates an error in the thermal measurements.

Then, jobs in the computer system may be scheduled for execution by at least one of the processor cores based on the analysis. Note that the scheduling may reduce spatial and temporal thermal variations in the integrated circuit even when a utilization factor in the computer system is low. In some embodiments, the scheduling is probabilistic, for example, based on an adaptive-random technique.

By performing such energy-aware and/or temperature-aware scheduling, this technique can lower and balance temperature and energy utilization at runtime with low performance overhead. Moreover, intelligent, energy-aware and/or temperature-aware scheduling can improve reliability, availability, serviceability and/or reduce operating costs in a wide variety of computer systems, including: servers, laptop computers, personal computers, work stations, mainframe computers, a digital signal processor, a portable-computing device, a personal organizer, a device controller, a computational engine within an appliance, as well as those computer systems that utilize symmetric multiprocessing (SMP) and/or multiprocessor system on-chip (MPSoC) architectures. In some embodiments, the scheduling is also based on locality.

Note that the term MSET as used in this specification refers to a class of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern-recognition approaches. Hence, the term MSET as used in this specification can refer to (among other things) any technique outlined in [Gribok], including: Ordinary Least Squares (OLS), Support Vector Machines (SVA), Artificial Neural Networks (ANNs), MSET, or Regularized MSET (RMSET).

Additionally, note that the computer system may be at one location or may be distributed over multiple, geographically dispersed locations. Consequently, instructions associated with the given job may be received and communicated within the computer system over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

We now describe embodiments of a computer system, a method, and software for scheduling loads across a set of processor cores disposed on an integrated circuit. FIG. 1 presents a block diagram illustrating an embodiment of a computer system 100. In this computer system, jobs 112 are received and added to a job queue 110. Next, scheduler 114, such as an OS-level scheduler, assigns a given job, such as job 112-1, to be executed by processor cores 118 in a processing module 116. In an exemplary embodiment, the processor cores 118 are disposed on a single integrated circuit. However, in other embodiments the processor cores 118 are disposed on two or more integrated circuits.

Typically, schedulers, such as scheduler 114, perform load balancing, in which jobs 112 are assigned based on resource availability, to optimize the throughput in the computer system 100. Note that factors associated with resource availability can include, but are not limited to: the number of processor cores 118, the speed of the processor cores 118, the amount of memory, the amount of disk space, currently available processor cores 118, and the closest available memory (or locality). However, many existing scheduling approaches are performed without regard for the energy consumption and/or the temperature of the processor cores 118. This can cause hot spots or hot zones in processing module 116, which can result in temperature gradients and/or thermal cycling of the processor cores 118 (and the previously described problems, such as reductions in: reliability, availability, serviceability and performance), especially when the computer system 100 is operating at less than 100% utilization (i.e., with a utilization factor that is less than 100%).

To overcome this problem, continuous telemetry monitoring via continuous system-telemetry monitor 120 (which is described further below with reference to FIG. 2) is used to build up and routinely update a history of thermal measurements (during time intervals) associated with jobs 112 and previously executed jobs, as well as with each of the processor cores 118 when the given job is executing. These thermal measurements are stored in data structures (such as tables) for use in subsequent analysis during which processor-core thermal properties 122 are determined. Note that these thermal properties may facilitate closed-loop control of the spatial and temporal thermal variations in the processing module 116 and/or the computer system 100.

In some embodiments, the thermal measurements include metrics associated with energy consumption and temperature. For example, the continuous system-telemetry monitor 120 may collect the actual observed energy and temperature dynamics in a multiple-processor-core system in near real-time. Moreover, observations for different jobs may be stored along with the associated jobs. When the given job executes for the first time, the entry in such a data structure(s) may be initialized with an empirical estimate of the temperature and energy consumption of the processor cores 118 that will execute the given job. Then, when the given job is executed again, the previously stored observations may be updated. In this way, this data structure becomes more accurate as the history is accumulated, for example, as the thermal measurements are averaged over time.

A wide variety of metrics may be used for the energy consumption and temperature associated with the given job and/or associated with each of the processor cores 118 (during a given time interval). In some embodiments, the energy metric reflects how much energy is consumed while running the given job and/or how much energy is consumed by each of the processor cores 118 during the given time interval. In principle, the temperature metric may be more complicated than the current temperature in the processor cores 118. In particular, even though different processor cores may have the same or similar temperatures, they may or may not have different thermal stresses. Consequently, in some embodiments the temperature metric may reflect the recent thermal stress in the processor cores 118 and/or the recent thermal stress in the processor cores 118 that have executed the given job. For example, the thermal stress may be represented by the temperature profile over time for each job and/or for each of the processor cores 118.

Note that both energy consumption and the temperature achieved may be used because each can be separately important. Energy consumption is important because, ultimately, the cooling of the computer system 100 must be able to remove that amount of energy (based on simple conservation of energy). However, the efficiency of power dissipation in the computer system 100 affects the temperature achieved. For example, a tiny, 10-W chip can reach very high temperatures if heat removal is inefficient. Conversely, a 200-W chip may stay quite cool if the coolant provisioning and heat removal are efficient.

In general, for a given cooling capacity in the computer system 100, the most efficient energy-consumption distribution is when the energy consumption is uniform across a chip. Similarly, for performance and reliability reasons, a uniform temperature distribution across the chip is also desirable. In this regard, the thermal measurements and the processor-core thermal properties 122 may facilitate energy-aware and temperature-aware scheduling in the computer system 100. In turn, this capability facilitates near real-time closed-loop balancing of the temperature and energy consumption across the processor cores 118, and thus, facilitates compensation for spatial and temporal temperature variations across the processor cores 118.

Consequently, for a set of jobs currently executing, this technique may facilitate an optimal energy-consumption and temperature configuration (which decreases cooling expenses, eases temperature-related design challenges, and improves system reliability), while simultaneously meeting performance requirements by adjusting for varying load profiles across the processor cores 118. Moreover, these goals can be achieved with low hardware and performance overhead.

Note that in some embodiments computer system 100 includes fewer or additional components. Moreover, two or more components may be combined into a single component and/or a position of one or more components may be changed.

Figure 2:
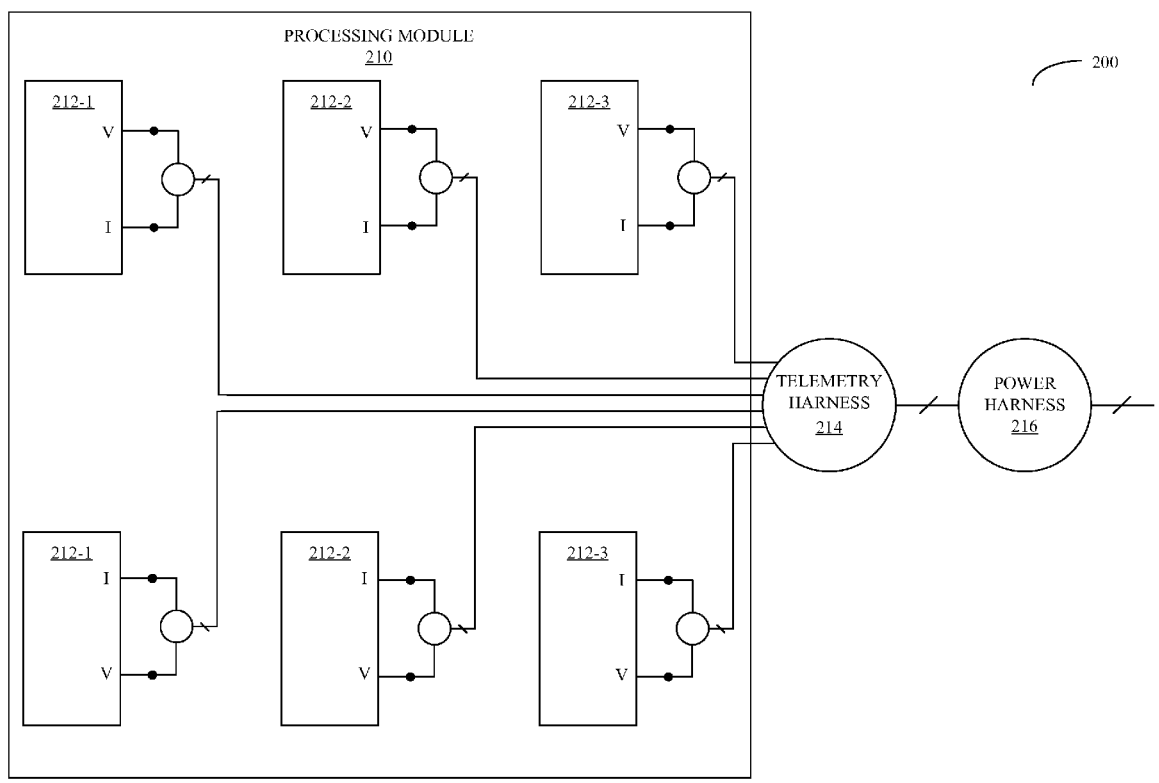
FIG. 2 is a block diagram illustrating a computer system in accordance with an embodiment of the present invention.

We now discuss embodiments of a continuous-telemetry-monitoring system. FIG. 2 presents a block diagram illustrating an embodiment of a computer system 200, in which real-time temperature and energy-consumption telemetry are generated by sensors (which are sometimes referred to as a 'power harness') in a processing module 210, such as an integrated circuit that includes multiple processor cores. In particular, a variety of instrumentation signals are monitored in real-time during operation of the computer system 200.

These instrumentation signals can include signals associated with 'internal performance parameters' maintained by software within the computer system 200. For example, these internal performance parameters can include: system throughput, transaction latencies, queue lengths, load on one or more processors or processor cores, load on the memory, load on the cache, I/O traffic, bus saturation metrics, FIFO overflow statistics, and/or various operational profiles gathered through 'virtual sensors' located within the operating system. Moreover, the instrumentation signals can also include signals associated with 'canary performance parameters' for synthetic-user transactions, which are periodically generated for the purpose of measuring quality of service from the end user's perspective.

Additionally, the instrumentation signals can include 'physical parameters' such as: distributed internal temperatures, environmental variables (such as relative humidity, cumulative or differential vibrations within the computer system 200, fan speed, acoustic signals, current noise, voltage noise, and/or time-domain reflectometry readings), and/or energy consumption (such as currents and voltages).

Computer system 200 includes a power harness 216, a telemetry harness 214, and sub-components 212, such as multiple processor cores disposed on a processing module 210. Power harness 216 may be a software-based tool that reads time-domain traces of the sensor variables from the telemetry harness 214 and computes the total power consumption (and thus, the energy consumption) based on the time-domain traces of the sensor variables. In a variation on this embodiment, the software-based tool is integrated into the computer system 200 as a software patch.

Telemetry harness 214 may be coupled to the sensor outputs in sub-components 212. Through these connections, telemetry harness 214 polls and aggregates the sensor variables for these sub-components. In some embodiments, telemetry harness 214 measures a voltage and an associated current from sensors in each of the sub-components 212 within the computer system 200. Note that the sub-components 212 can report other variables, such as temperature. For example, each of the processor cores disposed on processing module 210 may be associated with one or two thermal sensors (such as thermocouples or ring oscillators) that are in proximity to a given processor core. Also note that the telemetry harness 214 may measure sensor variables simultaneously from each sub-component within the computer system 200.

Values of a sensor variable may be reported in either an interrupt mode, periodically and/or continuously. For example, while operating in interrupt mode, the computer system 200 only receives a value of a sensor variable if the value exceeds a high-threshold value or a low-threshold value, and thereby causes an interrupt to occur. However, in some embodiments the sensors are periodically and/or continuously polled to create a dynamic trace of the sensor variables. In doing so, the computer system 200 creates a time-domain trace of the sensor variables for each sub-component and uses the time-domain trace to calculate total power consumption or the total energy consumption for the sub-components 212 and/or the computer system 200 as a function of time.

In some embodiments, the computer system 200 uses one or more calibration factors for a given class of computer system and/or for individual sensors to estimate power consumption or energy consumption based on dynamic traces of currents and associated voltages that are directly measured using a hardware power monitor, which accurately measures the power consumption of the sub-components 212 and/or the computer system 200. These calibration factors may compensate for inaccuracies in the power-consumption or energy-consumption calculation resulting from biases in low-accuracy sensors used in the computer system 200.

Note that in some embodiments computer system 200 includes fewer or additional components. Moreover, two or more components may be combined into a single component and/or a position of one or more components may be changed.

Figure 3A:
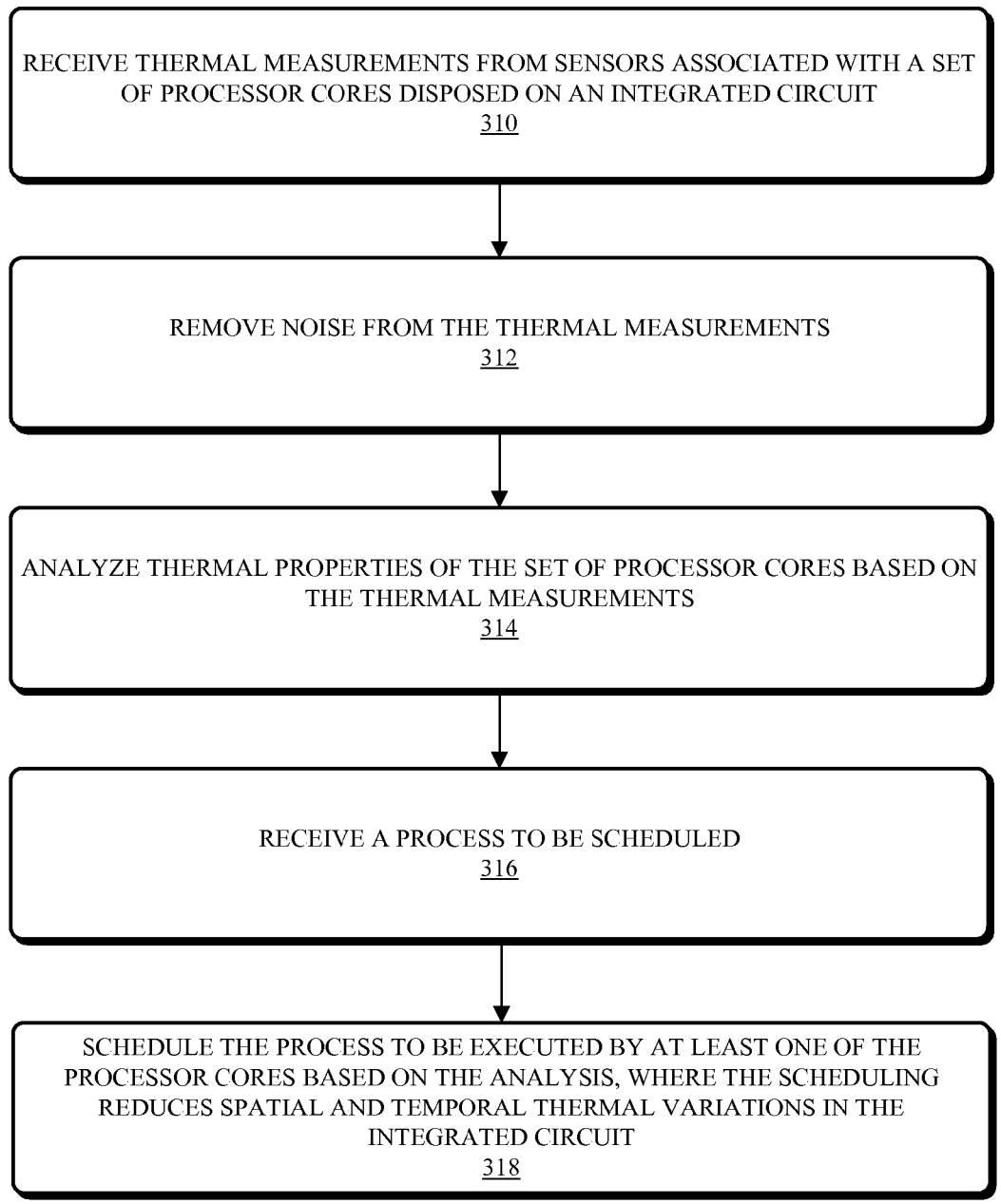
FIG. 3A is a flow chart illustrating a process for scheduling loads across a set of processor cores disposed on an integrated circuit in accordance with an embodiment of the present invention.

We now discuss methods for scheduling loads across a set of processor cores disposed on an integrated circuit. FIG. 3A presents a flow chart illustrating an embodiment of a process 300 for scheduling loads across a set of processor cores disposed on an integrated circuit, which may be implemented by a computer system, such as the computer system 100 (FIG. 1) and/or the computer system 200 (FIG. 2). During operation, the computer system receives thermal measurements from sensors associated with the set of processor cores (310), and removes noise from the thermal measurements (312). Then, the computer system analyzes thermal properties of the set of processor cores based on the thermal measurements (314). Next, the computer system receives a process to be executed (316), and schedules the process to be executed by at least one of the processor cores based on the analysis (318). Note that the scheduling reduces spatial and temporal thermal variations in the integrated circuit.

Figure 3B:
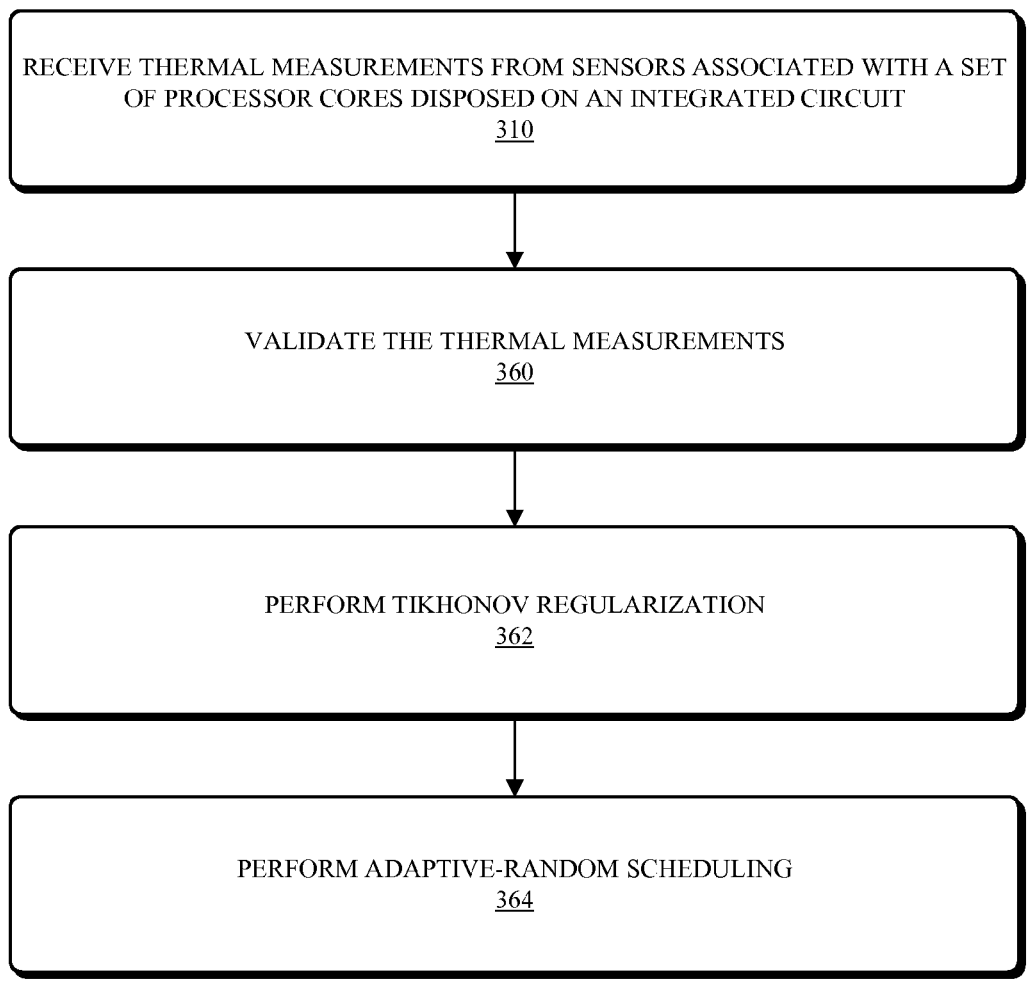
FIG. 3B is a flow chart illustrating a process for scheduling loads across a set of processor cores disposed on an integrated circuit in accordance with an embodiment of the present invention.

FIG. 3B presents a flow chart illustrating an embodiment of a process 350 for scheduling loads across a set of processor cores disposed on an integrated circuit, which may be implemented by a computer system, such as the computer system 100 (FIG. 1) and/or the computer system 200 (FIG. 2). During operation, the computer system receives thermal measurements during the time interval from sensors associated with the set of processor cores (310) (for example, from a continuous telemetry system, such as the one illustrated in FIG. 2), and validates the thermal measurements (360) and/or sensors using a regression model (such as a generic nonlinear, non-parametric regression model which performs pattern recognition). Then, the computer system reduces noise in the thermal measurements and/or the thermal properties (which are determined from the thermal measurements) by performing Tikhonov regularization (362). Moreover, using the thermal measurements and/or the thermal properties determined from the thermal measurements, the computer system may schedule jobs for processing by one or more of the processor cores by performing adaptive-random scheduling (364). Note that process 350 may facilitate real-time or near real-time feedback (for example, with a delay associated with the time interval) and control of spatial and temporal temperature variations in the integrated circuit.

Note that in some embodiments of processes 300 (FIG. 3A) and/or 350 there may be additional or fewer operations. Moreover, the order of the operations may be changed and/or two or more operations may be combined into a single operation. Additionally, the preceding operations may be implemented using hardware and/or software, as is known in the art.

We now describe exemplary embodiments of the scheduling technique. There are often considerable difficulties associated with simple temperature-aware scheduling techniques. For example, if threads or jobs are assigned to the coolest processor core or the coolest chip (in a multi-chip system), larger thermal variations may result and energy consumption may increase. One reason for this is that temperature sensors in many computer systems have a relatively high uncertainty and can drift out of calibration, so that assigning jobs to the coolest processor core can still lead to temperature variations and oscillations. Consequently, using raw sensor data in a feedback and control loop can result in worse thermal distributions if one or more of the temperature sensors begins to fail. In addition, noise on the input temperature signals can result in a higher variance in the actions of a feedback control system, and therefore, can lead to a greater waste of energy.

In the scheduling technique described in this disclosure, these challenges are addressed by: collecting continuous-system-telemetry data (as described previously in FIG. 2); performing real-time signal validation and sensor operability validation using a nonlinear, non-parametric regression model; and/or reducing noise in the thermal measurements and/or thermal properties using Tikhonov regularization. Moreover, to avoid oscillation in the feedback-control system which attempts to reduce thermal variations in the set of processor cores disposed on an integrated circuit, a probabilistic technique is used to assign jobs across the set of processor cores. In this way, the scheduling technique may perform temperature-aware scheduling.

Note that this scheduling technique can adapt to workload variations, be they purely random or reproducible, such as when customer applications run the same program routines but with different data. Consequently, the scheduling technique may improve after a training time interval. In particular, if the energy consumption and temperature of the processor cores are determined for a given job using the thermal measurements, then the next time the same job is received, the scheduler (such as scheduler 114 in FIG. 1) may assign this job to the processor core(s) that minimizes the energy consumption and/or achieves the best temperature distribution in the computer system.

In some embodiments, thermal sensors are included in the integrated circuit, and these sensors are read using a continuous system telemetry harness (CSTH) that collects and analyzes time-series sensor data. Moreover, this data may be regularly analyzed to facilitate real-time or near real-time feedback control. For example, the time-series data may be written to memory and subsequently read by the operating system.

Note that thermal measurements obtained using physical sensors typically have an uncertainty of 5-9%. Moreover, the resulting signals are often processed using low-resolution analog-to-digital circuits that give rise to quantization noise. In addition, as noted previously, there is often a related problem of long-term sensor operability integrity. In particular, the embedded thermal sensors are typically calibrated at the beginning of life, but they can subsequently drift (for example, because of a linear de-calibration bias).

To address this problem, an advanced pattern-recognition technique, such as MSET, may be used to perform signal validation and/or sensor operability validation. (Note that this and other analysis of the thermal measurements may be performed by a thread which is separate from the threads associated with other processes or jobs that are executed in the set of processor cores.) In particular, MSET may be used to predict what each of the temperature signals is likely to be based on other correlated CSTH signals. If there is a departure between the MSET estimate and the real sensor signal, that is an indication that the sensor calibration is drifting or that there is otherwise degradation in the sensor. In this case, the MSET estimate may be used during the temperature-aware scheduling technique instead of the more vulnerable and/or less reliable raw sensor signal.

While the MSET estimate may be more reliable than the raw signal, the MSET estimate still contains noise, which can lead to suboptimal performance of the temperature-aware scheduling technique. To address this noise, a de-noising technique, such as Tikhonov regularization, which achieves optimal variance reduction with minimal introduction of bias in the temperature estimates may be used to drive the scheduler, such as the scheduler 114 (FIG. 1).

We now describe exemplary embodiments of Tikhonov regularization, which can be used to minimize or reduce noise in the thermal measurements and/or the thermal properties (such as the MSET-estimated signals). Given a set of observed noisy temperature measurements $\{y(t)\}$, where t is a time series 0, 1, 2, ..., T, the goal is to reconstruct the original, noise-free temperature $y_o(t)$, assuming that the additive noise e(t) can be represented as one or more independent and identically distributed random variables (e.g., the additive noise may be characterized by a Gaussian distribution having a standard deviation of one).

To de-noise y(t), an auto-regression model and additional knowledge of the smoothness of the original temperature may be used. In particular, the auto-regression model relating the current value of y(t) to lagged values y(t−1), y(t−2), etc. may be given by $$y(t)=b(1)\cdot y(t-1)+\ldots+b(K)\cdot y(t-K)+e(t),$$

where y is a (T−K)×1 vector y=[y(K+1), y(K+2), ..., y(T)]', and b is vector of regression coefficients b=[b(1), b(2), ..., b(K)]'. Expressing y(t) in matrix form and hiding the time dependence, the regression model becomes $$y=X\cdot b+e,$$

where X is (T−K)×K matrix X=[[y(K), ..., y(T−1)]', [y(K−1), ..., y(T−2)]', ..., [y(1), ..., y(T−K)]'].

The regression coefficients for the regression model may be determined by minimizing a cost function (using Tikhonov regularization)

$$\|X\cdot b-y\|^2+\lambda^2\cdot\|D\cdot y_o\|^2,$$

where $\lambda$ is a regularization parameter that controls the trade-off between the small bias and smooth estimates for y, and D is a matrix representing the discrete approximation to the second-order derivative operator. Note that the term $\|D\cdot y_o\|^2$ represents the norm of the second derivative of the original signal (i.e., the smoothness of the original signal). Because the original signal is not known, it can be estimated by $X\cdot b$. Consequently, this optimization problem may be solved by minimizing $$\|X\cdot b-y\|^2+\lambda^2\|D\cdot X\cdot b\|^2.$$

The closed-form solution of this optimization problems provides the estimates of the regression model (the regression coefficients) that are obtained by minimizing residuals and requiring smooth temperature estimates (i.e., $y_{ESTIMATED}=X\cdot b$) at the same time. Note that the $$b_{ESTIMATED}=(X'\cdot X+\lambda^2\cdot X'\cdot D'\cdot D\cdot X)^{-1}\cdot X'\cdot y.$$

In some embodiments, the regularization parameter $\lambda$ is selected using a cross-validation technique.

We now describe exemplary embodiments of the adaptive-random scheduling technique. This probabilistic technique is used to balance the workload in the computer system and to avoid thermal problems without introducing significant complexity to the scheduler, such as scheduler 114 (FIG. 1). During this scheduling technique, an adaptive-random policy updates probabilities of sending workload to processor cores at each time interval based on an analysis of the recent thermal properties, such as the temperature history, of the set of processor cores in the integrated circuit. Taking the temperature history into account allows the workload to be allocated to processor cores that have been exposed to lower thermal stress (to increase reliability, accessibility and serviceability) and/or that are on cooler parts of the integrated circuit (to reduce energy consumption).

For example, assume three processor cores having the same current temperature, but different temperature histories. If all of these processor cores are idle, a policy that looks only at the instantaneous temperature would not differentiate among these three processor cores. An adaptive-random policy favors the processor core with the lower average temperature during the history window (such as the most recent N time interval). This is a better choice because this processor core and its neighbors have been under lower thermal stress. By preferentially scheduling new workload to the processor cores with lower average temperature during the history window, the adaptive-random policy also achieves better performance by reducing penalties associated with spatial thermal gradients (such as delays).

During the adaptive-random scheduling technique, a new probability value for each of the processor cores is computed using Eqn. 1 when each workload chunk arrives. In this equation, $P_n$ is the new probability, $P_o$ is the previous probability, and W is the weight. Note that $P_n$ saturates at 0 and 1.

$$P_n = P_o \pm W. \quad (1)$$

Note that different values of W may be used when increasing or decreasing the probability associated with a given processor core.

To include an evaluation of the thermal stress on each of the processor cores, W is computed at regular intervals using a sliding window of recent temperature history. In an exemplary embodiment, if the thermal constant of the computer system is on the order of a few hundred milliseconds, the time interval and the sliding window can be one second in order to account for rapid changes in temperature (however, other window lengths can be used depending on the system characteristics). Note that because Eqn. 1 is only computed when workload arrives, the computation cost associated with this scheduling technique is negligible. Consequently, this scheduling technique does not stall execution of other jobs or threads.

Using Eqn. 1, the probabilities for the processor cores are decremented or incremented by W based on whether their average temperatures have risen above an upper temperature threshold (Thigh) or dropped below a lower temperature threshold (Tlow), respectively. In an exemplary embodiment, Thigh is 80 C, which is lower than 85 C to prevent hot spots from occurring. Moreover, in order to avoid allocating workload to processor cores that have temperatures slightly below 80 C, Tlow may be 75 C.

When adjusting the probabilities, there are three possible scenarios that are considered by the scheduler (such as the scheduler 114 in FIG. 1): if the average temperature of a given processor core exceeds Thigh during the previous time interval, its $P_n$ is set to 0; if the average temperature of the given processor core is between Tlow and Thigh during the previous time interval, $P_n$ is unchanged; and if the average temperature of a given processor core is less than Tlow during the previous time interval, its $P_n$ is increased by the W determined using $$W = \frac{\beta}{Avg},$$

where β is proportionality factor, and Avg is the average temperature below Thigh divided by Thigh (which ensures that processor cores having lower average temperatures during the time interval have larger values of W). In an exemplary embodiment, β is 0.1. Note that β may be determined empirically for a given system.

After the probabilities are updated, the current job is allocated to one of the processor cores by generating one or more random or pseudo-random numbers based on the probabilities. In some embodiments, one or more pseudo-random numbers are generated using a linear-feedback shift register.

Figure 4:
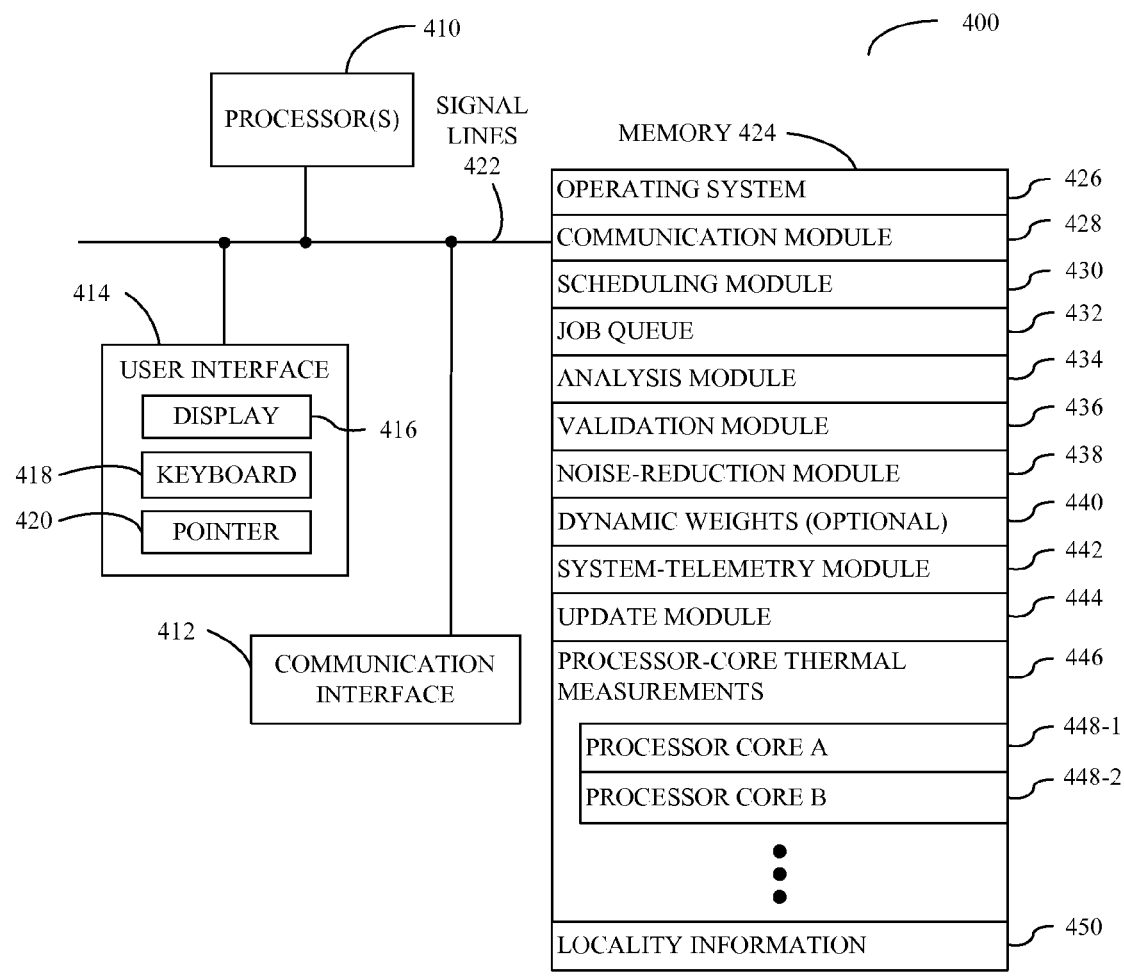
FIG. 4 is a block diagram illustrating a computer system in accordance with an embodiment of the present invention.

We now describe additional embodiments of a computer system. FIG. 4 presents a block diagram illustrating an embodiment of computer system 400, such as the computer system 100 in FIG. 1 and/or the computer system 200 in FIG. 2. Computer system 400 includes: one or more processors (or processor cores) 410, a communication interface 412, a user interface 414, and one or more signal lines 422 coupling these components together. Note that the one or more processors (or processor cores) 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to the computer system 400.

Memory 424 may also include one or more program modules (or a set of instructions), including: scheduling module 430 (or a set of instructions), analysis module 434 (or a set of instructions), validation module 436 (or a set of instructions), noise-reduction module 438 (or a set of instructions), system-telemetry module 442 (or a set of instructions), and/or update module 444 (or a set of instructions).

System-telemetry module 442 may aggregate thermal measurements associated with various jobs and/or associated with the processors (or processor cores) 410 using sensors disposed on the processors (or processor cores) 410 and/or virtual sensors that monitor parameters in operating system 426. Moreover, update module 444 may store thermal measurements, such as those associated with the processors (or processor cores) 410, in processor-core thermal measurements 446. For example, processor-core thermal measurements 446 may include thermal measurements for processor core A 448-1 and/or processor core B 448-2.

Additionally, validation module 436 may determine if any of the thermal measurements are in error (for example, using a regression model such as MSET). If a thermal measurement from a given sensor is in error, it may be replaced by a prediction determined using thermal measurements from other sensors and the regression model. Noise in the thermal measurements (such as jitter or quantization noise) may be reduced by noise-reduction module 438, which may use another regression model, such as Tikhonov regularization.

Analysis module 434 may determine thermal properties based on the thermal measurements. These thermal properties, such as energy consumption and/or temperature in processors (or processor cores) 410, may be used by scheduling model 430 to assign jobs in job queue 432 to one or more of the processors (or processor cores) 410, thereby: performing dynamic load balancing across the processors (or processor cores) 410 to improve performance while reducing spatial and temporal temperature variations in the processors (or processor cores) 410.

In some embodiments, the scheduling is probabilistic (for example, based on an adaptive-random technique), where the probabilities for the processors (or processor cores) 410 may be determined using optional dynamic weights 440. Moreover, in some embodiments the scheduling is based, at least in part, on locality information 450. For example, scheduling module 430 may attempt to map related processes to processor cores that share the same memory, and to assign jobs using this mapping.

Instructions in the various modules in the memory 424 may be implemented in: a high-level procedural language, an object-oriented programming language, and/or in an assembly or machine language. The programming language may be compiled or interpreted, i.e., configurable or configured to be executed by the one or more processors (or processor cores) 410.

Although the computer system 400 is illustrated as having a number of discrete components, FIG. 4 is intended to be a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computer system 400 may include fewer components or additional components. Moreover, two or more components may be combined into a single component and/or a position of one or more components may be changed. In some embodiments the functionality of computer system 400 may be implemented more in hardware and less in software, or less in hardware and more in software, as is known in the art.

Figure 5:
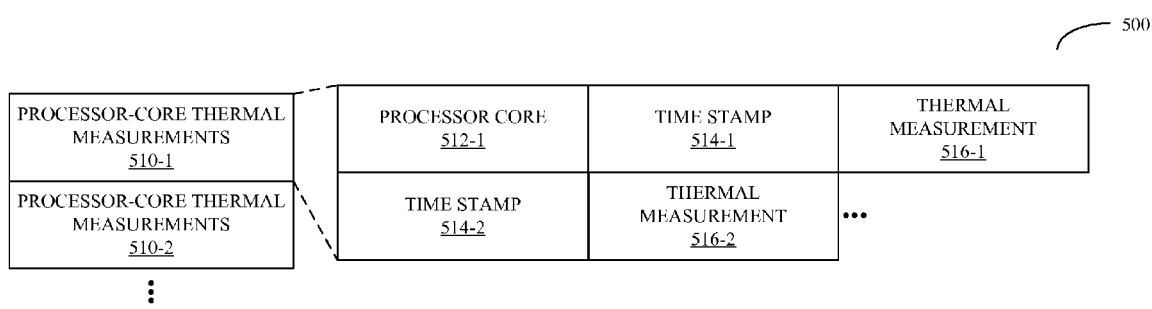
FIG. 5 is a block diagram illustrating a data structure in accordance with an embodiment of the present invention.

We now discuss data structures that may be used in the computer systems 100 (FIG. 1), 200 (FIG. 2), and/or 400 (FIG. 4). FIG. 5 presents a block diagram illustrating an embodiment of a data structure. This data structure may include processor-core thermal measurements 510. More specifically, a given instance of the processor-core thermal measurements 510, such as processor-core thermal measurements 510-1, may include: an associated processor core 512-1, and multiple pairs of time stamps 514 and thermal measurements 516.

Figure 6:
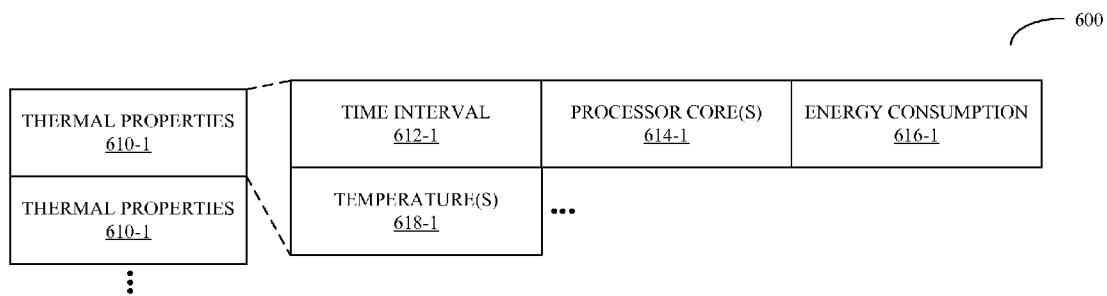
FIG. 6 is a block diagram illustrating a data structure in accordance with an embodiment of the present invention.

FIG. 6 presents a block diagram illustrating an embodiment of a data structure. This data structure may include thermal properties 610. More specifically, a given instance of the thermal properties 610, such as thermal properties 610-1, may include: a time interval 612-1, one or more processor cores 614-1, and their associated energy consumption 616-1 and temperatures 618-1 during the time interval 612-1.

Note that that in some embodiments of the data structures 500 (FIG. 5) and/or 600 there may be fewer or additional components. Moreover, two or more components may be combined into a single component and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for scheduling loads across a set of processor cores disposed on an integrated circuit, comprising:
    receiving thermal measurements from sensors associated with the set of processor cores, wherein the thermal measurements are received during a time interval;
    removing noise from the thermal measurements received during the time interval;
    analyzing thermal properties of the set of processor cores based on the thermal measurements from which noise was removed;
    receiving a process to be executed; and
    scheduling the process to be executed by at least one of the processor cores based on the analysis, wherein the scheduling reduces spatial and temporal thermal variations in the integrated circuit.

2. The method of claim 1, wherein the thermal properties include energy consumption.

3. The method of claim 1, wherein the thermal properties include temperature.

4. The method of claim 1, wherein the scheduling attempts to map related processes to processor cores that share the same memory.

5. The method of claim 1, wherein the scheduling is based on thermal properties of the set of processor cores while previous processes were executed.

6. The method of claim 1, wherein the scheduling facilitates load balancing across the set of processor cores.

7. The method of claim 1, wherein the thermal measurements include continuous telemetry measurements that are received from sensors disposed on the integrated circuit in proximity to the set of processor cores.

8. The method of claim 7, wherein removing noise from the thermal measurements involves validating the thermal measurements by comparing thermal measurements from the given sensor with predictions of a regression model that is based on measurements of other sensors that have a predetermined relationship with the thermal measurements from the given sensor.

9. The method of claim 8, wherein the regression model includes a multivariate state estimation technique (MSET).

10. The method of claim 8, wherein the predictions are used instead of the thermal measurements if the comparison indicates an error in the thermal measurements.

11. The method of claim 1, wherein a regression model is used to reduce noise in the thermal measurements without adding bias.

12. The method of claim 11, wherein the regression model includes Tikhonov regularization.

13. The method of claim 1, wherein the thermal properties are estimated based, at least in part, on parameters of a computer system that includes the integrated circuit; and
    wherein the parameters are determined using virtual sensors in an operating system of the computer system.

14. The method of claim 1, wherein analyzing the thermal properties involves using a thread which is separate from threads associated with other processes that are executed in the set of processor cores.

15. The method of claim 1, wherein the thermal measurements are received during a time interval; and
    wherein the analysis of the thermal properties is based on thermal measurements during the time interval.

16. The method of claim 1, wherein the scheduling is probabilistic; and
    wherein a probability of assigning processes to a given processor core during a time interval is determined based on one or more thermal properties of the given processor core during the time interval and a dynamic weight associated with the given processor core.

17. The method of claim 16, wherein the probability of assigning processes is determined using an adaptive-random technique.

18. The method of claim 16, wherein the one or more thermal properties includes temperature.

19. A computer-program product for use in conjunction with a computer system, the computer-program product comprising a computer-readable storage medium and a computer-program mechanism embedded therein for scheduling loads across a set of processor cores disposed on an integrated circuit, the computer-program mechanism including:
- instructions for receiving thermal measurements from sensors associated with the set of processor cores, wherein the thermal measurements are received during a time interval;
- instructions for removing noise from the thermal measurements received during the time interval;
- instructions for analyzing thermal properties of the set of processor cores based on the thermal measurements from which noise was removed;
- instructions for receiving a process to be executed; and
- instructions for scheduling the process to be executed by at least one of the processor cores based on the analysis, wherein the scheduling reduces spatial and temporal thermal variations in the integrated circuit.

20. A computer system, comprising:
- a set of processor cores disposed on an integrated circuit;
- memory configured to store thermal measurements associated with a set of processor cores; and
- a scheduler, wherein the scheduler is configured to execute instructions, and wherein the instructions include:
- instructions for receiving the thermal measurements from sensors associated with the set of processor cores, wherein the thermal measurements are received during a time interval;
- instructions for removing noise from the thermal measurements received during the time interval;
- instructions for analyzing thermal properties of the set of processor cores based on the thermal measurements from which noise was removed;
- instructions for receiving a process to be executed; and
- instructions for scheduling the process to be executed by at least one of the processor cores based on the analysis, wherein the scheduling reduces spatial and temporal thermal variations in the integrated circuit.

\* \* \* \* \*

UNITED STATES PATENT AND TRADEMARK OFFICE
CERTIFICATE OF CORRECTION

| | | |
|---|---|---|
| PATENT NO. | : 7,716,006 B2 | Page 1 of 1 |
| APPLICATION NO. | : 12/109572 | |
| DATED | : May 11, 2010 | |
| INVENTOR(S) | : Ayse K. Coskun et al. | |

It is certified that error appears in the above-identified patent and that said Letters Patent is hereby corrected as shown below:

In column 4, line 48, delete "(SVA)," and insert -- (SVM), --, therefor.

In column 10, line 28, delete "$\|X \cdot b - y\|^2 + \lambda^2 \|D \cdot X \cdot b\|^2$." and insert -- $\|X \cdot b - y\|^2 + \lambda^2 \cdot \|D \cdot X \cdot b\|^2$. --, therefor.

Signed and Sealed this
Twenty-sixth Day of July, 2011

David J. Kappos
*Director of the United States Patent and Trademark Office*